US009015486B2

(12) United States Patent
Bender et al.

(10) Patent No.: US 9,015,486 B2
(45) Date of Patent: Apr. 21, 2015

(54) SYSTEMS, DEVICES, AND METHODS FOR OUTPUTTING ALERTS TO INDICATE THE USE OF A WEAK HASH FUNCTION

(75) Inventors: Christopher L. Bender, Kitchener (CA); Michael K. Brown, Fergus (CA); Michael S. Brown, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/608,549

(22) Filed: Sep. 10, 2012

(65) Prior Publication Data

US 2013/0007454 A1 Jan. 3, 2013

Related U.S. Application Data

(63) Continuation of application No. 11/863,712, filed on Sep. 28, 2007, now Pat. No. 8,295,486.

(51) Int. Cl.
*G06F 21/00* (2013.01)
*H04L 9/32* (2006.01)

(52) U.S. Cl.
CPC ............ *H04L 9/3247* (2013.01); *H04L 9/3236* (2013.01); *H04L 2209/80* (2013.01)

(58) Field of Classification Search
None
See application file for complete search history.

(56) References Cited

U.S. PATENT DOCUMENTS

| | | |
|---|---|---|
| 4,868,877 A | 9/1989 | Fischer |
| 5,638,446 A | 6/1997 | Rubin |
| 6,185,684 B1 | 2/2001 | Pravetz et al. |
| 6,389,534 B1 | 5/2002 | Elgamal et al. |
| 6,513,111 B2 | 1/2003 | Klimczak et al. |
| 6,721,784 B1 | 4/2004 | Leonard et al. |
| 6,834,341 B1 | 12/2004 | Bahl et al. |
| 6,920,564 B2 | 7/2005 | Decuir |
| 6,931,532 B1 | 8/2005 | Davis et al. |
| 6,931,597 B1 | 8/2005 | Prakash |
| 7,085,925 B2 | 8/2006 | Hanna et al. |
| 7,140,044 B2 | 11/2006 | Redlich et al. |
| 7,203,845 B2 | 4/2007 | Sokolic et al. |
| 7,263,607 B2 | 8/2007 | Ingerman et al. |
| 7,443,321 B1 | 10/2008 | Kaufman et al. |

(Continued)

FOREIGN PATENT DOCUMENTS

| | | |
|---|---|---|
| CA | 2639331 A1 | 3/2009 |
| CA | 2373059 | 10/2009 |

(Continued)

OTHER PUBLICATIONS

Abe, Masayuki, "Securing "Encryption + Proof of Knowledge" in the Random Oracle Model", 2002, Springer-Verlag Berlin Heidelberg, CT-RSA 2002, LNCS 2271, p. 277-289.*

(Continued)

*Primary Examiner* — Jeffery Williams
(74) *Attorney, Agent, or Firm* — Integral Intellectual Property Inc.; Mariam Paton

(57) ABSTRACT

Systems, devices, and methods for outputting an alert on a mobile device to indicate the use of a weak hash function are disclosed herein. In one example embodiment, the method comprises receiving data (e.g. from a server) that identifies at least one first hash function, identifying a hash digest generated using a second hash function, determining if the second hash function is weak using the received data, and outputting an alert indicating that the second hash function is weak if it is determined that the second hash function is weak.

20 Claims, 13 Drawing Sheets

(56) References Cited

U.S. PATENT DOCUMENTS

| | | | |
|---|---|---|---|
| 7,602,903 | B2 | 10/2009 | Ene-Pietrosanu et al. |
| 7,634,657 | B1 | 12/2009 | Stringham |
| 7,657,741 | B2 | 2/2010 | Adams et al. |
| 8,347,089 | B2 | 1/2013 | Adams et al. |
| 2002/0169957 | A1 | 11/2002 | Hale et al. |
| 2003/0135751 | A1 | 7/2003 | O'Donnell et al. |
| 2003/0140246 | A1 | 7/2003 | Kammer et al. |
| 2004/0117657 | A1 | 6/2004 | Gabor et al. |
| 2004/0203589 | A1 | 10/2004 | Wang et al. |
| 2004/0220975 | A1 | 11/2004 | Carpentier et al. |
| 2005/0021969 | A1* | 1/2005 | Williams et al. ............... 713/176 |
| 2005/0039004 | A1 | 2/2005 | Adams et al. |
| 2005/0086511 | A1 | 4/2005 | Balacheff et al. |
| 2005/0132206 | A1 | 6/2005 | Palliyil et al. |
| 2005/0229004 | A1 | 10/2005 | Callaghan |
| 2006/0136719 | A1* | 6/2006 | Doyle et al. ................... 713/157 |
| 2007/0043948 | A1 | 2/2007 | Bugbee |
| 2007/0130188 | A1 | 6/2007 | Moon et al. |
| 2007/0245159 | A1 | 10/2007 | Youn |
| 2010/0146270 | A1 | 6/2010 | Adams et al. |
| 2013/0133065 | A1 | 5/2013 | Adams et al. |

FOREIGN PATENT DOCUMENTS

| | | | |
|---|---|---|---|
| EP | 1265182 | A3 | 12/2003 |
| EP | 1748624 | | 1/2007 |
| EP | 2043295 | | 4/2009 |
| EP | 2375630 | A2 | 10/2011 |
| JP | 1041934 | | 2/1989 |
| JP | 2000-244547 | | 9/2000 |
| JP | 2001-308844 | | 11/2001 |
| JP | 2003006126 | | 1/2003 |
| WO | 0189253 | A1 | 11/2001 |
| WO | 03014861 | | 2/2003 |

OTHER PUBLICATIONS

Hirai, et al., "Classification of Hash Functions Suitable for Real-life System", NIST, 2nd Hash Workshop, Aug. 24, 2006, p. 1-24.*
Communication Pursuant to Article 94(3) EPC. European Application No. 07117573.1. Dated: Jan. 30, 2009.
Response/Amendment. Co-pending U.S. Appl. No. 10/832,155. Dated: Feb. 19, 2008.
Final Rejection. Co-pending U.S. Appl. No. 10/832,155. Dated: Jun. 9, 2008.
Response/Amendment. Co-pending U.S. Appl. No. 101832,155. Dated: Sep. 9, 2008.
Advisory Action. Co-pending U.S. Appl. No. 10/832,155. Dated: Sep. 17, 2008.
Response/Amendment. Co-pending U.S. Appl. No. 10/832,155. Dated: Dec. 9, 2008.
Request for Continued Examination (RCE). Co-pending U.S. Appl. No. 10/832,155. Dated: Dec. 9, 2008.
Office Action after RCE. Co-pending U.S. Appl. No. 10/832,155. Dated: Jan. 21, 2009.
Response/Amendment. Co-pending U.S. Appl. No. 10/832,155. Dated: Apr. 21, 2009.
Final Office Action after RCE. Co-pending U.S. Appl. No. 10/832,155. Dated: Jul. 6, 2009.
Response/Amendment. Co-pending U.S. Appl. No. 10/832,155. Dated: Sep. 8, 2009.
Notice of Allowance. Co-pending U.S. Appl. No. 10/832,155. Dated: Sep. 16, 2009.
Ramsdell B: "RFC 2633: S/MIME Version 3 Message Specification" RFC 2633, Jun. 1999. Retrieved from the internet on Mar. 30, 2011.
Zimmerman P. et al. "PGP Message Exchange Formats" RFC 1991, Aug. 1996. Retrieved from the internet on Mar. 30, 2011.
Co-pending U.S. Appl. No. 12/697,955, filed Feb. 1, 2010, "System and Method of Indicating the Strength of Encryption".
Syroid, et al.: "Outlook 2000 in a Nutshell", O'Reilly, Apr. 1, 2000, ISBN: 978-1-56-592704-9.
Piper et al., "Cryptography, A Very Short Introduction", 2002, Oxford University Press, p. 60, 70, 71.
Infocellar, "Hash Functions (Hash Algorithms)", 2004, www.infocellar.com/networks/Security/hash.htm, pp. 1-6, accessed via http://web.archive.org, Dec. 20, 2010.
IEEE, "The Authoritative Dictionary of IEEE Standards Terms", 7th ed., 2000, IEEE, p. 297, 684, 752, 872, 937, 1031, 1112, 1113, 1234, 1235.
European Search and Examination Report. Application No. 07117573.1. Dated: May 29, 2008.
Burtin S. Kaliski, Jr., 2002. On Hash Function Firewalls in Signature Schemes. In Proceedings of the Cryptographer's Track at the RSA Conference on Topics in Cryptology (CT-RSA '02), Bart Preneel (Ed.). Springer-Verlag, London, UK, 1-16.
Co-pending U.S. Appl. No. 12/697,955. United States Office Action Dated Sep. 16, 2011.
Office Action. Canadian Patent Application No. 2,639,331. Dated: Nov. 9, 2011.
Response to examination report for European patent application No. 07117573.1, dated May 13, 2009.
Response to EESR for European patent application No. 07117573.1, dated Sep. 4, 2008.
Extended European Search Report for European patent application No. 11151774.4, dated Mar. 22, 2012.
Office Action Response for U.S. Appl. No. 12/697,955, dated Jan. 16, 2012.
Final Rejection U.S. Appl. No. 12/697,955, dated Feb. 23, 2012.
Response to the Extended European Search Report for European patent application No. 11151774.4, dated May 24, 2012.
European Exam Report, EP patent application No. 07117573.1, dated Jun. 11, 2012.
Kaliski, Burt, RSA Laboratories, "Hash Function Firewalls in Signature Schemes", IEEE P1363 Working Group Meeting, Jun. 2, 2000. http://www.rsa.com/rsalabs/staff/bios/bkaliski/publications/hash-firewalls/kaliski-hash-firewalls-june-2000.ppt.
United States Office Action. Co-pending U.S. Appl. No. 10/832,155 Dated: Sep. 26, 2007.
Co-pending U.S. Appl. No. 10/832,155, filed Apr. 26, 2004, "System and Method of Indicating the Strength of Encryption".
Canadian Response to First Office Action. Canadian Patent Application No. 2,639,331, dated May 3, 2012.
United States Notice of Allowance, Co-pending U.S. Appl. No. 12/697,955, dated Aug. 31, 2012.
United States Request for Continued Examination and Response, Co-pending U.S. Appl. No. 12/697,655, dated Jun. 21, 2012.
Response to Examination Report. European Patent Application No. 07117573.1. Dated Oct. 17, 2012.
Summons to Oral Proceedings. European Patent Application No. 07117573.1. Dated Nov. 9, 2012.
Response Summons to Oral Proceedings. European Patent Application No. 07117573.1. Dated Nov. 26, 2012.
Summons to Oral Proceedings. European Patent Application No. 07117573.1. Dated Dec. 6, 2012.
Acknowledgement of Summons to Oral Proceedings. European Patent Application No. 07117573.1. Dated Dec. 10, 2012.
Written Submissions. European Patent Application No. 07117573.1. Dated May 3, 2013.
Written Submissions. European Patent Application No. 07117573.1. Dated May 22, 2013.
Result of telephone consultation. European Patent Application No. 07117573.1. Dated May 24, 2013.
Minutes. European Patent Application No. 07117573.1. Dated Jun. 5, 2013.
Decision to Refuse. European Patent Application No. 07117573.1. Dated Jun. 18, 2013.
Intent to Grant. Co-pending U.S. Appl. No. 12/697,955. Dated Dec. 12, 2012.
Intent to Grant. Co-pending U.S. Appl. No. 10/832,155. Dated Jan. 13, 2010.
U.S. Appl. No. 11/863,712, now issued as U.S. Patent No. 8,295,486. Prosecution documents.

(56) References Cited

OTHER PUBLICATIONS

Office Action. Co-pending U.S. Appl. No. 13/721,516. Dated Oct. 21, 2013.
Amendment. U.S. Appl. No. 13/721,516. Dated: Jan. 21, 2014.
Terminal Disclaimer. U.S. Appl. No. 13/721,516. Dated: Jan. 21, 2014.
Notice of Allowance. U.S. Appl. No. 13/721,516. Dated: Feb. 21, 2014.
Examination Report. European Patent Application No. 11151774.4. Dated Jul. 2, 2014.
Result of telephone consultation. European Patent Application No. 11151774.4. Dated Sep. 2, 2014.

* cited by examiner

SYSTEMS, DEVICES, AND METHODS FOR OUTPUTTING ALERTS TO INDICATE THE USE OF A WEAK HASH FUNCTION

CROSS-REFERENCE TO RELATED APPLICATION

This application is a continuation of U.S. patent application Ser. No. 11/863,712, filed Sep. 28, 2007 and issued to patent as U.S. Pat. No. 8,295,486. The entire contents of U.S. application Ser. No. 11/863,712 are hereby incorporated by reference.

TECHNICAL FIELD

Embodiments described herein relate generally to mobile devices, and more specifically to hash functions used to generate hash digests that are processed by mobile device applications.

BACKGROUND

A hash function is generally a transformation that takes an input and returns a fixed-size string or number, which is called the hash value. A hash value may also be referred to as a message digest, a hash digest, or more simply as a hash, for example. A hash is generally substantially smaller than the input itself, and may be regarded as a "digital fingerprint" of the input.

Depending on the application, it may be desirable that a hash be generated by a formula or algorithm (referred to generally herein as a hash function) in such a way that it is extremely unlikely that some other input will produce the same hash. Hash functions with this property may be suitable for a variety of computational purposes, including cryptography. For example, hash functions may be employed to generate hash digests that are used in the production of digital signatures. Such digital signatures may be utilized in a variety of applications for authentication purposes in the processing of messages. For example, "messages" in this context may include, without limitation, electronic mail messages, certificate data, or messages transmitted between computing devices in accordance with a cryptographic protocol.

BRIEF DESCRIPTION OF THE DRAWINGS

For a better understanding of embodiments described herein, and to show more clearly how they may be carried into effect, reference will now be made, by way of example, to the accompanying drawings in which.

DETAILED DESCRIPTION

Figure 1:
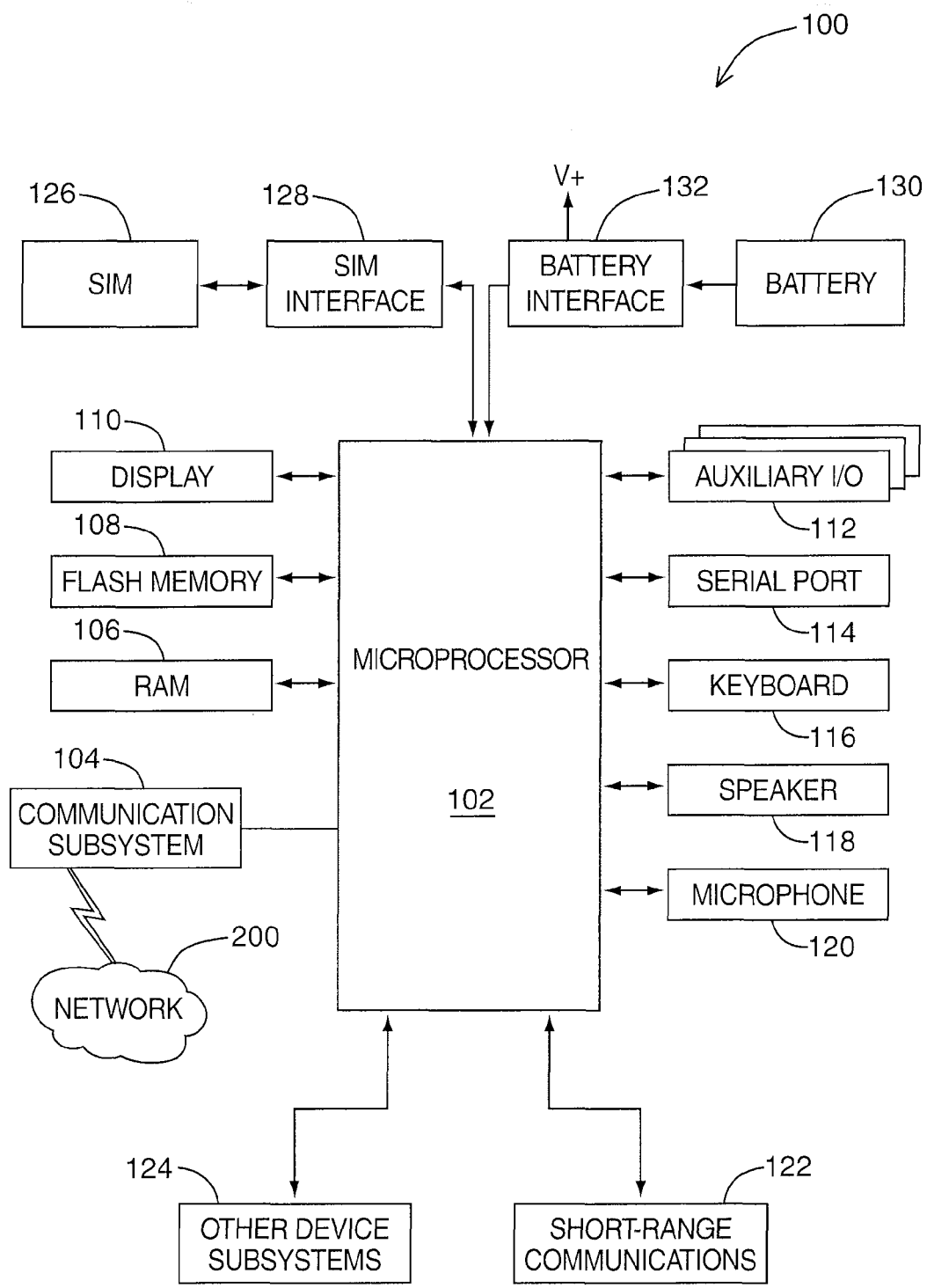
FIG. 1 is a block diagram of a mobile device in one example implementation.

A hash function that may be considered well-designed for use in cryptographic applications, including for example public key cryptographic applications, generally comprises a "one way" operation in that it is desirable that there be no practical way to calculate a particular data input that will result in a specified hash value. An attacker, however, may act to deliberately try to find different inputs that produce the same hash value generated by a given hash function. If an attacker were able to discover such inputs, the attacker would potentially be able to inject data into a system that users have assumed is secure. In this manner, for example, the attacker may be able to trick users into trusting nefarious data, which may render the system less secure.

Researchers have found weaknesses in certain hash functions. These hash functions may be considered "weak" for certain applications. Furthermore, different organizations may have different sensitivities to which hash functions ought to be considered as weak, depending on the contents of the data being subject to hashing and on the anticipated resources of potential attackers, for example.

At least some embodiments described herein are generally directed to providing methods of warning users of a mobile device if the security of certain data being processed at the mobile device might be at risk. In particular, a hash function that is considered weak, either generally by persons in the art or by an administrator of a system in which the mobile device operates for example, may have been used to generate one or more hash digests that may be employed to authenticate data being processed at the mobile device. If a weak hash function had been used to generate the hash digests, then the authentication results may be inaccurate.

It may be desirable to detect, at the mobile device, when a weak hash function has been used to generate a particular hash digest. This may be facilitated by storing a list identifying weak hash functions on the mobile device. However, a hash function that is not considered weak at a particular point in time may be considered weak at some future point in time. Accordingly, it may not be suitable to provide a list identifying weak hash functions that is hard-coded on the mobile device at the time of its manufacture, for example.

In one broad aspect, there is provided a method of transmitting data to a mobile device, the method comprising: identifying at least one first hash function at a server; and transmitting data identifying the at least one first hash function to a mobile device, the data for use in determining whether a second hash function used to generate a hash digest identified at the mobile device is weak.

In another broad aspect, the method of transmitting data to a mobile device further comprises outputting a listing of a plurality of first hash functions in a user interface, and receiving input specifying one or more selected first hash functions from the plurality of first hash functions, wherein the at least one first hash function identified at the server comprises the one or more selected first hash functions.

In another broad aspect, there is provided a server comprising a processor and a memory, wherein the server is programmed to execute a plurality of instructions which, when executed, cause the processor to perform the following: identify at least one first hash function at the server; and transmit data identifying the at least one first hash function to a mobile device, the data for use in determining whether a second hash function used to generate a hash digest identified at the mobile device is weak.

In another broad aspect, there is provided a computer-readable medium on which a plurality of executable instructions is stored, the instructions for performing the following on a server: identifying at least one first hash function at the server; and transmitting data identifying the at least one first hash function to a mobile device, the data for use in determining whether a second hash function used to generate a hash digest identified at the mobile device is weak.

In another broad aspect, there is provided a method of outputting an alert on a mobile device, the method comprising: receiving data (e.g. from a server) that identifies at least one first hash function; identifying a hash digest (e.g. at the mobile device) generated using a second hash function; determining, using the data received at said receiving, if the second hash function is weak; and outputting an alert indicating that the second hash function is weak if it is determined that the second hash function is weak.

In another broad aspect, each of the at least one first hash function is identified as being weak, and the second hash function is determined to be weak if the second hash function matches any of the at least one first hash function identified by the data received at said receiving.

In another broad aspect, there is provided a mobile device comprising a processor and a memory, wherein the mobile device is programmed to execute a plurality of instructions which, when executed, cause the processor to perform the following: receive data (e.g. from a server) that identifies at least one first hash function; identify a hash digest (e.g. at the mobile device) generated using a second hash function; determine, using the data received, if the second hash function is weak; and output an alert indicating that the second hash function is weak if it is determined that the second hash function is weak.

In another broad aspect, there is provided a computer-readable medium on which a plurality of executable instructions is stored, the instructions for performing the following on a mobile device: receiving data (e.g. from a server) that identifies at least one first hash function; identifying a hash digest (e.g. at the mobile device) generated using a second hash function; determining, using the data received at said receiving, if the second hash function is weak; and outputting an alert indicating that the second hash function is weak if it is determined that the second hash function is weak.

In another broad aspect, there is provided a system for outputting an alert on a mobile device, the system comprising: a server comprising a processor and a memory, wherein the server is programmed to execute a plurality of instructions which, when executed, cause the processor of the server to identify at least one first hash function at a server, and transmit data identifying the at least one first hash function to the mobile device, the data for use in determining whether a second hash function used to generate a hash digest identified at the mobile device is weak; and the mobile device, which comprises a processor and a memory, wherein the mobile device is programmed to execute a plurality of instructions which, when executed, cause the processor of the mobile device to receive data (e.g. from a server) that identifies at least one first hash function, identify a hash digest (e.g. at the mobile device) generated using a second hash function, determine using the data received if the second hash function is weak, and output an alert indicating that the second hash function is weak if it is determined that the second hash function is weak.

These and other aspects, features and embodiments will be described in greater detail in the description that follows.

Some embodiments described herein make use of a mobile station. A mobile station generally comprises a two-way communication device with advanced data communication capabilities having the capability to communicate with other devices, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device may communicate with other devices through a network of transceiver stations.

Figure 2:
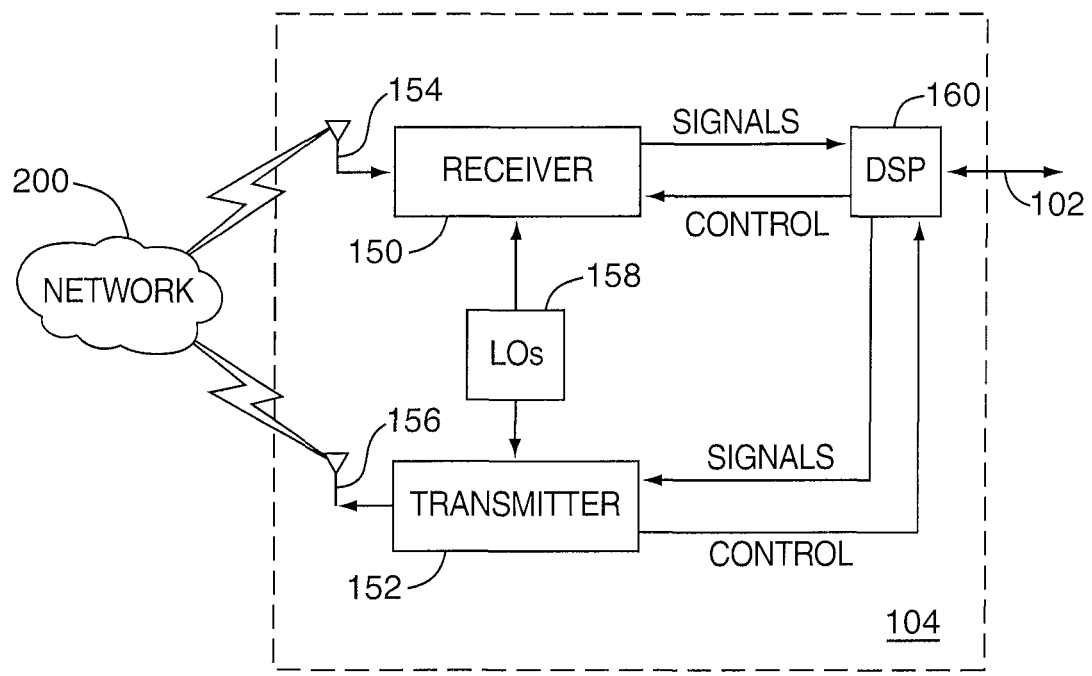
FIG. 2 is a block diagram of a communication subsystem component of the mobile device of FIG. 1.
Figure 3:
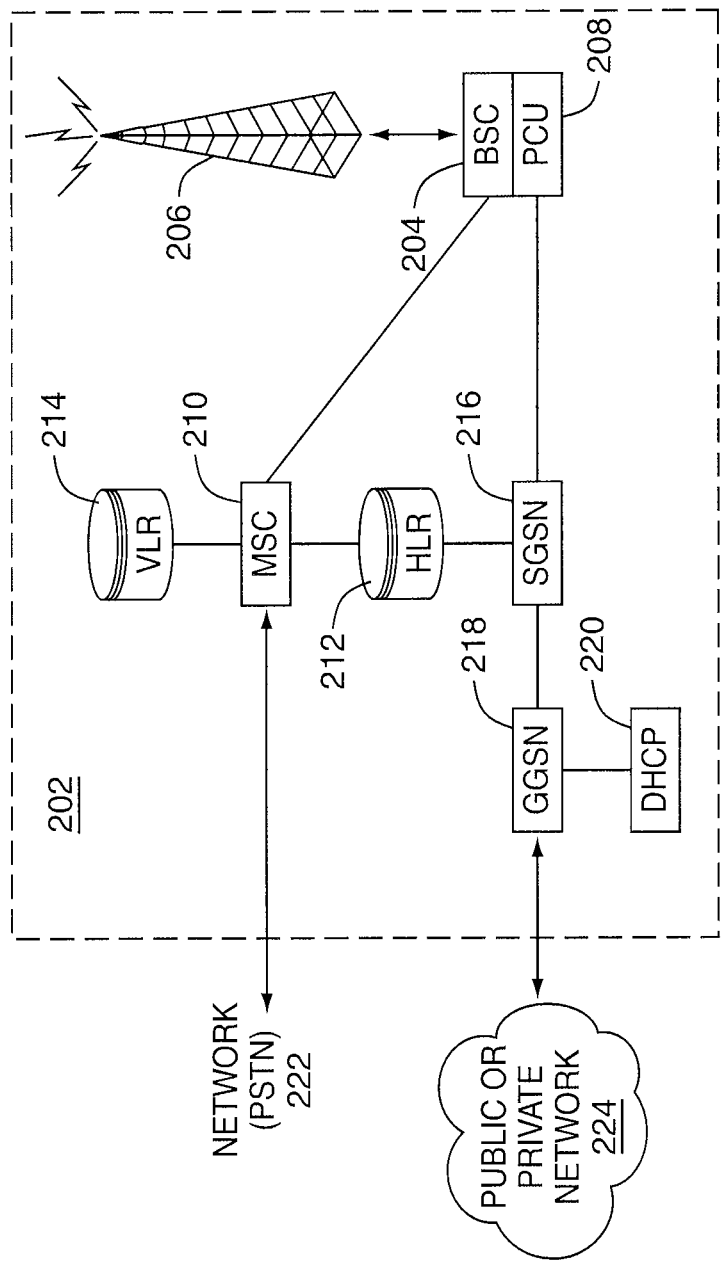
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In one example implementation of mobile device 100, communication subsystem 104 may be configured in accordance with the Global System for Mobile Communication (GSM) and General Packet Radio Services (GPRS) standards. The GSM/GPRS wireless network is used worldwide and it is expected that these standards may be supplemented or superseded eventually by Enhanced Data GSM Environment (EDGE), Universal Mobile Telecommunications Service (UMTS), and Ultra Mobile Broadband (UMB), etc. New standards are still being defined, but it is believed that they will have similarities to the network behaviour described herein, and it will also be understood by persons skilled in the art that the embodiments of the present disclosure are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Other network communication technologies that may be employed include, for example, Integrated Digital Enhanced Network (iDENT™), Evolution-Data Optimized (EV-DO), and High Speed Downlink Packet Access (HSDPA), etc.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 may provide for a Subscriber Identity Module ("SIM") card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services may include without limitation: web browsing and messaging such as e-mail, voice mail, Short Message Service (SMS), and Multimedia Messaging Services (MMS). More advanced services may include without limitation: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 may be a battery-powered device and may include a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide the power to mobile device 100. In some embodiments, mobile device 100 may be solar-powered.

Microprocessor 102, in addition to its operating system functions, enables execution of software applications on mobile device 100. A set of applications that control basic device operations, including data and voice communication applications, may be installed on mobile device 100 during its manufacture. Another application that may be loaded onto mobile device 100 is a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication include standards developed by the Infrared Data Association (IrDA), Bluetooth®, and the 802.11 family of standards (Wi-Fi®) developed by IEEE.

In use, a received signal such as a text message, an e-mail message, or web page download is processed by communication subsystem 104 and input to microprocessor 102. Microprocessor 102 then processes the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 may comprise an alphanumeric keyboard and/or telephone-type keypad. A composed item may be transmitted over network 200 through communication subsystem 104.

For voice communications, the overall operation of mobile device 100 is substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate; thus, it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource, typically due to limits in overall bandwidth and limited battery power of mobile device 100.

When mobile device 100 is fully operational, transmitter 152 may be typically keyed or turned on only when it is sending to network 200 and may otherwise be turned off to conserve resources. Similarly, receiver 150 may be periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with GPRS and GSM technologies; however, in other embodiments, different standards may be implemented as discussed in more detail above. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 performs a "GPRS Attach" to acquire an IP address and to access data services. This normally is not present in circuit switched voice channels as Integrated Services Digital Network (ISDN) addresses are used for routing incoming and outgoing calls. Currently, GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
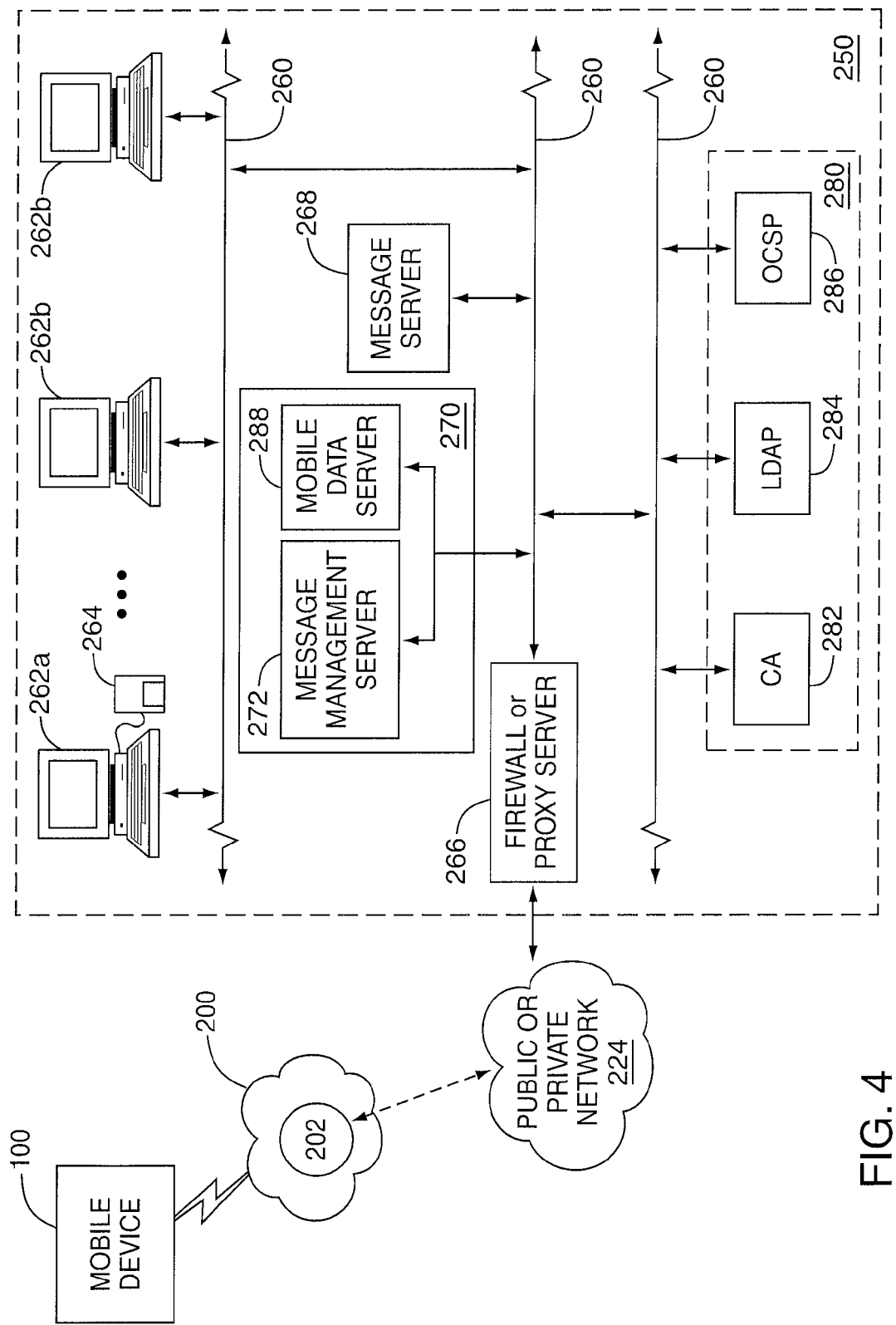
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262*a* with an accompanying cradle 264 for the user's mobile device 100 is situated on LAN 250. Cradle 264 for mobile device 100 may be coupled to computer 262*a* by a serial or a Universal Serial Bus (USB) connection, for example. Other user computers 262*b* are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262*a* to mobile device 100, and may be particularly useful for bulk information updates often performed in initializing mobile device 100 for use. The information downloaded to mobile device 100 may include certificates used in the exchange of messages.

It will be understood by persons skilled in the art that user computers 262*a*, 262*b* will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection may include, for example, a Transmission Control Protocol (TCP)/IP or User Datagram Protocol (UDP)/IP connection to deliver the messages directly to mobile device 100 in this variant implementation.

Messages, such as e-mail messages for example, which are intended for a user of mobile device 100 may be initially received by a message server 268 of LAN 250. Such messages may originate from any of a number of sources. For instance, a message may have been sent by a sender from a computer 262*b* within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262*a* may request the e-mail messages associated with that user's account that are stored on message server 268. These messages may then typically be retrieved from message server 268 and stored locally on computer 262*a*.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's security policy, also referred to herein as an information technology (IT) policy) to make this request at the direction of the user, at some predefined time interval, or upon the occurrence of some predefined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 may be used, for example, to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

Furthermore, in accordance with at least one embodiment, message management server is also configured to provide mobile device 100 with data, which can be defined by an administrator in accordance with an IT policy for example, that mobile device 100 can use to determine whether a particular hash function used in the processing of messages at mobile device 100 is considered weak. Further details pertaining to these embodiments will be provided in the present description.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices is supported.

Some embodiments described herein generally relate to the processing of encoded messages, such as e-mail messages that are encrypted or signed or both. While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and protects data integrity and privacy from the time an originator of a message sends a message until it is decoded and read by the message recipient. Other known standards and protocols may be employed to facilitate secure message communication, such as Pretty Good Privacy™ (PGP), OpenPGP, and others known in the art.

Secure messaging protocols such as S/MIME rely on public and private encryption keys to provide confidentiality and integrity, and on a Public Key Infrastructure (PKI) to communicate information that provides authentication and authorization. Data encoded using a private key of a private key/public key pair can only be decoded using the corresponding public key of the pair, and data encoded using a public key of a private key/public key pair can only be decoded using the corresponding private key of the pair. It is intended that private key information never be made public, whereas public key information may be shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using a digital signature. A digital signature generally comprises a digest of the message, such as a hash digest that is generated by applying a hash function using the message data as input. The hash digest is then encoded using the sender's private key, which can then be appended to the outgoing message. To verify the digital signature of the message when received, the recipient uses the same technique as the sender (e.g. using the same standard hash function) to obtain a digest of the received message. The recipient also uses the sender's public key to decode the digital signature, in order to obtain what should be a matching digest for the received message. If the digests of the received message do not match, this suggests that either the message content was changed during transport and/or the message did not originate from the sender whose public key was used for verification. Digital signature algorithms are designed in such a way that only someone with knowledge of the sender's private key should be able to encode a signature that the recipient will decode correctly using the sender's public key. Therefore, by verifying a digital signature in this way, authentication of the sender and message integrity can be maintained.

An encoded message may be encrypted, signed, or both encrypted and signed. The authenticity of public keys used in these operations may be validated using certificates. A certificate is a digital document that may be issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509).

Figure 5:
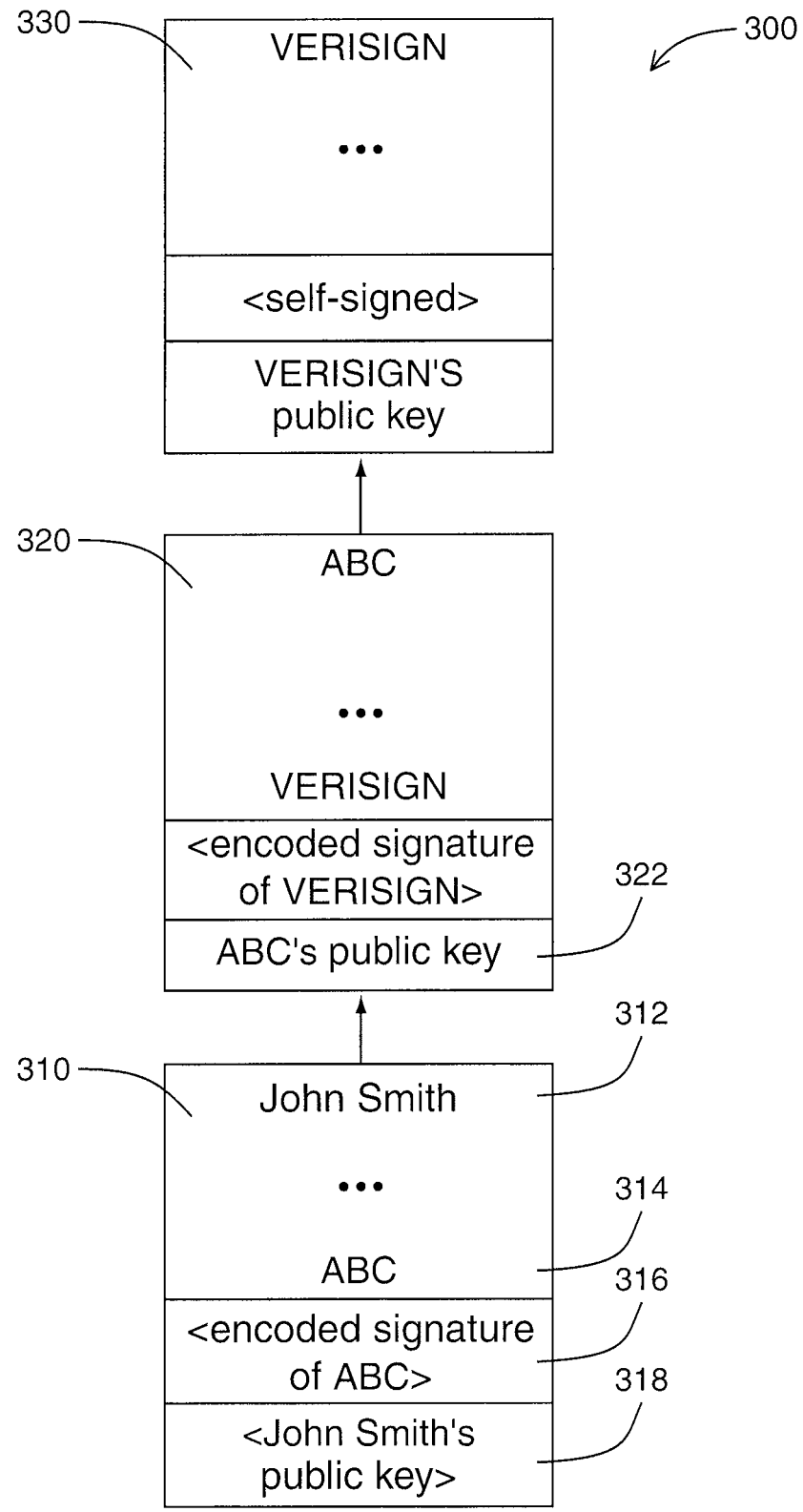
FIG. 5 is a block diagram showing an example of a certificate chain.

Consider FIG. 5, in which an example certificate chain 300 is shown. Certificate 310 issued to "John Smith" is an example of a certificate issued to an individual, which may be referred to as an end entity certificate. End entity certificate 310 typically identifies the certificate holder 312 (i.e. John Smith in this example) and the issuer of the certificate 314 (ABC in this example), and includes a digital signature of the issuer 316 and the certificate holder's public key 318. Certificate 310 may also include other information and attributes that identify the certificate holder (e.g. e-mail address, organization name, organizational unit name, location, etc.). When the individual composes a message to be sent to a recipient, it is customary to include that individual's certificate 310 with the message.

The certificate holder identified in a certificate is also referred to as the "subject" of that certificate. From the perspective of a given certificate holder, a certificate issued to him or her, and which typically contains his or her public key, may be referred to as a "personal certificate". Accordingly, in the example of FIG. 5, certificate 310 may be regarded as John Smith's personal certificate, as John Smith is the subject of certificate 310.

For a public key to be trusted, its issuing organization must be trusted. The relationship between a trusted CA (certificate authority or certification authority) and a user's public key can be represented by a series of related certificates, also referred to as a certificate chain. The certificate chain can be identified and followed to determine the validity of a certificate.

For instance, in the example certificate chain 300 shown in FIG. 5, the recipient of a message purported to be sent by John Smith may wish to verify the trust status of certificate 310 attached to the received message. To verify the trust status of certificate 310 on a recipient's computing device (e.g. computer 262a of FIG. 4) for example, the certificate 320 of issuer ABC is obtained, and used to verify that certificate 310 was indeed signed by issuer ABC. This requires verifying that the digital signature 316 of issuer ABC appended to certificate 310 is valid. As will be described in greater detail below, at least one embodiment disclosed herein relates generally to identifying when a weak hash function has been used to generate a hash digest of a digital signature of a certificate (e.g. 310, 320, 330) in a particular certificate chain (e.g. 300). Certificate 320 may already be stored in a certificate store on the recipient's computing device, or it may need to be retrieved from a certificate source (e.g. Lightweight Directory Access Protocol (LDAP) server 284 of FIG. 4 or some other public or private LDAP server). If certificate 320 is already stored in the recipient's computing device and the certificate has been designated as trusted by the recipient, then certificate 310 is considered to be trusted since it chains to a stored, trusted certificate.

However, in the example shown in FIG. 5, certificate 330 is also required, when verifying the trust status of certificate 310. Certificate 330 is self-signed, and is referred to as a "root certificate". Accordingly, certificate 320 may be referred to as an "intermediate certificate" in certificate chain 300; any given certificate chain to a root certificate, assuming a chain to the root certificate can be determined for a particular end entity certificate, may contain zero, one, or multiple intermediate certificates. If certificate 330 is a root certificate issued by a trusted source (from a large certificate authority such as Verisign or Entrust, for example), then certificate 310 may be considered to be trusted since it chains to a trusted certificate. The implication is that both the sender and the recipient of the message trust the source of the root certificate 330. If a particular certificate cannot be chained to a trusted certificate, that certificate may be considered to be "not trusted".

Certificate servers store information about certificates and lists identifying certificates that have been revoked. These certificate servers can be accessed to obtain certificates and to verify certificate authenticity and revocation status. For example, an LDAP server may be used to obtain certificates, and an Online Certificate Status Protocol (OCSP) server may be used to verify certificate revocation status.

Standard e-mail security protocols typically facilitate secure message transmission between non-mobile computing devices (e.g. computers 262a, 262b of FIG. 4; remote desktop devices). Referring again to FIG. 4, in order that signed messages received from senders may be read from mobile device 100 and encrypted messages be sent to those senders, mobile device 100 is adapted to store certificates and associated public keys of other individuals. Certificates stored on a user's computer 262a may be downloaded from computer 262a to mobile device 100 through cradle 264, for example.

Certificates stored on computer 262a and downloaded to mobile device 100 are not limited to certificates associated with individuals but may also include certificates issued to CAs, for example. Certain certificates stored in computer 262a and/or mobile device 100 can also be explicitly designated as "trusted" by the user. Accordingly, when a certificate is received by a user on mobile device 100, it can be verified on mobile device 100 by matching the certificate with one stored on mobile device 100 and designated as trusted, or otherwise determined to be chained to a trusted certificate.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key may be exchanged between the computer 262a and mobile device 100 so that the user may share one identity and one method for accessing messages.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization reside on LAN 250. PKI servers 280 include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates through a mobile data server 288. Similarly, mobile data server 288 may be adapted to allow mobile device 100 to directly query OCSP server 286 to verify the revocation status of certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates [not shown] may include a Windows® certificate store, another secure certificate store on or outside LAN 250, and smart cards, for example.

Figure 6:
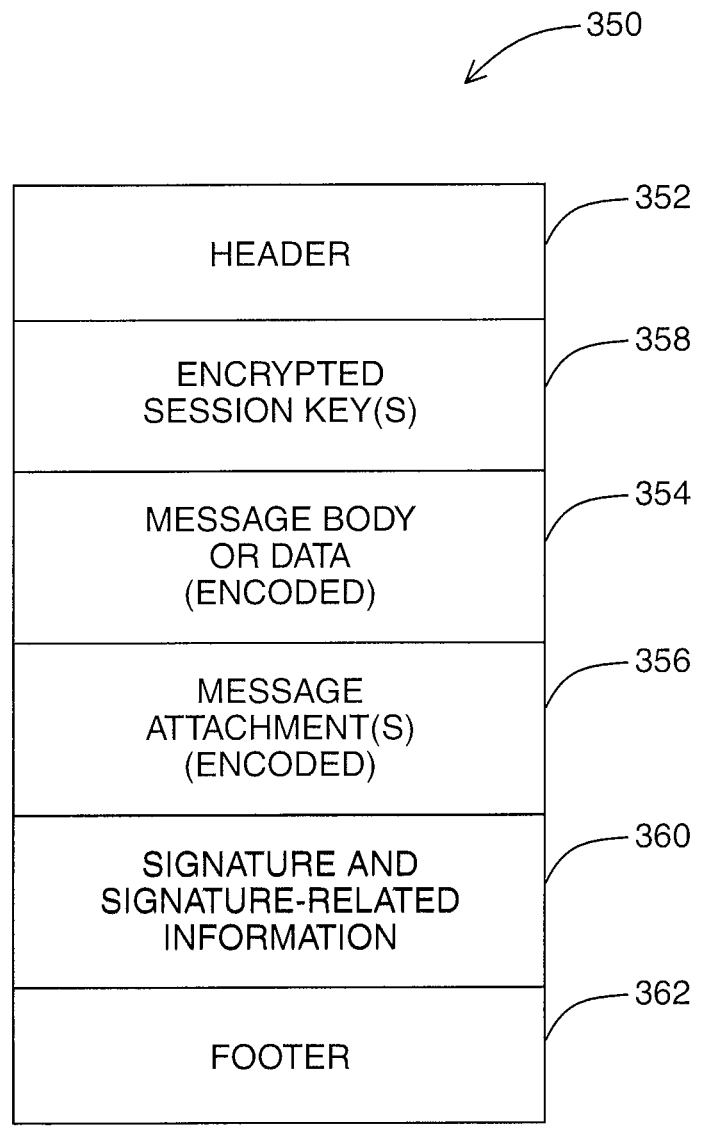
FIG. 6 is a block diagram illustrating components of an example of an encoded message.

Referring now to FIG. 6, a block diagram illustrating components of an example of an encoded message, as may be received by a message server (e.g. message server 268 of FIG. 4), is shown generally as 350. Encoded message 350 typically includes one or more of the following: a header portion 352, an encoded body portion 354, optionally one or more encoded attachments 356, one or more encrypted session keys 358, a digital signature and signature-related information 360, and a footer 362.

For example, header portion 352 typically includes addressing information such as "To", "From", and "CC" addresses, and may also include message length indicators, and sender encryption and digital signature scheme identifiers, for example. Actual message content normally includes a message body or data portion 354 and possibly one or more attachments 356, which may be encrypted by the sender using a session key. If a session key was used, it is typically encrypted for each intended recipient using the respective public key for each recipient, and included in the message at 358. If the message was signed, a digital signature and signature-related information 360 are also included. The signature-related information may include the sender's certificate and other information (e.g. an identifier that indicates the hash function used to generate the hash digest of the digital signature), for example. As will be described in greater detail below, at least one embodiment disclosed herein relates generally to identifying when a weak hash function has been used to generate a hash digest of the digital signature of a message (e.g. 360).

The format for an encoded message as shown in FIG. 6 is provided by way of example only, and persons skilled in the art will understand that encoded messages may exist in other formats. For example, depending on the specific messaging scheme used, components of an encoded message may appear in a different order than shown in FIG. 6, and an encoded message may include fewer, additional, or different components, which may depend on whether the encoded message is encrypted, signed or both.

Applications of public key cryptography are not limited to those related to the transmission of e-mail messages between computing devices. More generally, there is often a need to secure data that is sent between applications across an untrusted network. Secure communications protocols such as the Transport Layer Security (TLS) protocol, the Secure Sockets Layer (SSL) protocol, and the Private Communications Transport protocol (PCT), for example, are based on public key cryptography.

While some embodiments are described herein with reference to SSL, other protocols other than SSL may be employed in variant embodiments. For example, use of the TLS protocol is becoming increasingly common, and TLS is widely used to provide confidentiality and authentication for many applications. It will be understood that other versions of SSL, TLS and other protocols, including those that may be developed in the future, might also be employed in variant embodiments.

A protocol such as SSL or TLS may be used to establish a secure connection between two peers, such as a client and a server, for example. A secure connection may be established to facilitate communications on the Internet, for applications including, without limitation, web browsing, e-mail, instant messaging, and other data transfers. A goal of a protocol such as SSL or TLS is to provide privacy and data integrity between two communicating applications. Symmetric cryptography techniques may be employed for data encryption to ensure that the connection between the client and the server is private. In the establishment of a secure connection between a client and a server, the identity of the client, the server, or both may be authenticated using public key cryptography techniques. While the authentication can be made optional, it is generally required for at least one of the two peers (e.g. the server). If the server is authenticated, even where the client remains unauthenticated, an end user (e.g. an individual or an application such as a web browser) may be provided with a sufficient level of certainty that it is in communication with the peer with whom it thinks it is communicating. In some applications, the authentication of both peers may be required, in a process generally referred to as mutual authentication.

In accordance with a protocol such as TLS or SSL, when a server (e.g. a web server) is to be authenticated, the server sends back identification to the party that requested authentication (e.g. a mobile device or other computing device, a proxy server) in the form of a digital certificate. This certificate associated with the server, also referred to herein as a server certificate, may comprise the server name, an identification of an issuing CA, and the server's public key. A client, for example, may confirm that the server certificate is authentic before proceeding, by using the CA's public key to validate the CA's digital signature on the server certificate. If the digital signature can be verified successfully, and the CA is trusted, the client may accept the server certificate as a valid certificate issued by a trusted CA. If the CA is not trusted, the client may verify that the server certificate chains to a trusted CA certificate. As will be described in greater detail below, at least one embodiment disclosed herein relates generally to identifying when a weak hash function has been used to generate a hash digest used to form the digital signature of a server certificate, or more generally, of a certificate belonging to a certificate chain that comprises the server certificate.

Figure 7A:
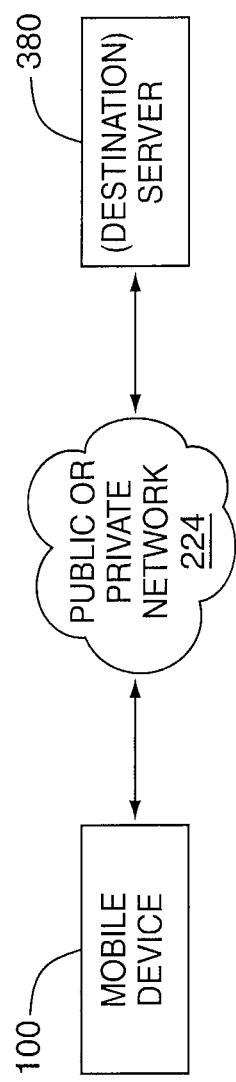
FIGS. 7A and 7B are block diagrams illustrating example client/server system configurations.
Figure 7B:
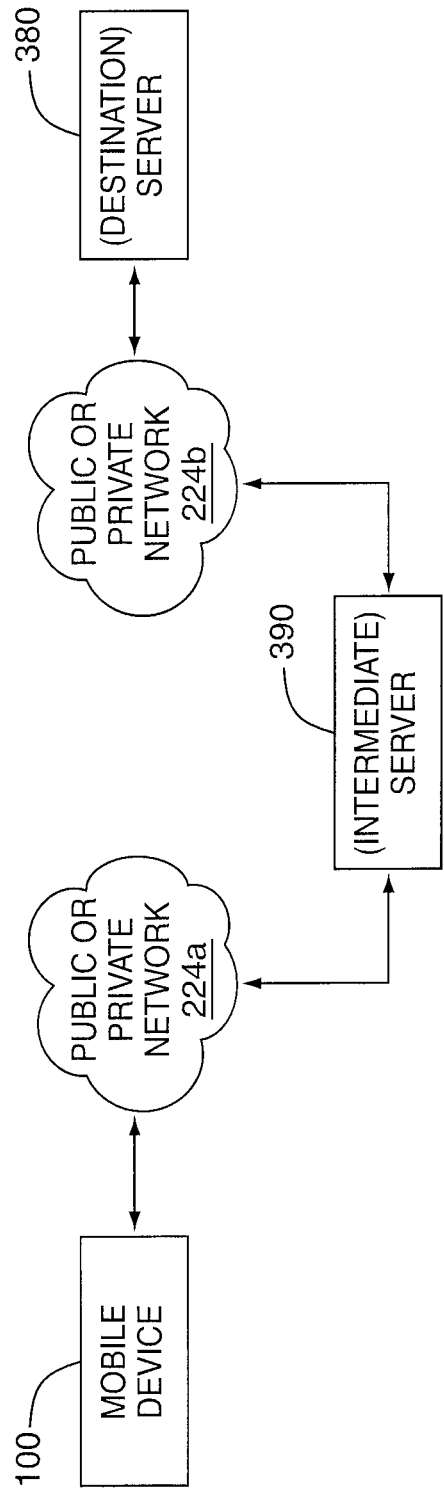

FIGS. 7A and 7B illustrate a number of example client/server system configurations. In these examples, the client is an application residing on a mobile device. In FIG. 7A, an application residing on mobile device 100 establishes a secure connection directly with a destination server 380 (e.g. a web server) over a public or private network 224 such as the Internet. While a protocol such as TLS may be used with web browsers to allow a user of a computing device, such as mobile device 100, to browse the Internet more securely, TLS is also a general-purpose protocol that can be used for any application, whenever authentication and data protection may be desired. In FIG. 7B, the application residing on mobile device 100 establishes a secure connection with the destination server 380 via an intermediate proxy server 390. Intermediate proxy server 390 may be employed to establish the secure connection on behalf of mobile device 100. The functions of intermediate proxy server 390 may be implemented, for example, by a mobile data server (e.g. mobile data server 288 of FIG. 4), by a message management server (e.g. message management server 272 of FIG. 4), or by another server.

Consider again, by way of example, the TLS protocol. TLS facilitates the authentication of servers and clients to prove the identities of parties engaged in secure communication, through the use of certificates and public or private keys. In the establishment of a TLS connection, the destination server typically authenticates its identity to the client residing on a computing device, such as a mobile device. However, the client may not need to authenticate with the destination server, depending on the application. Generally, unless the destination server requires authentication of a user of the computing device, users do not need to be known to a destination server before a TLS connection with the destination server can be established. However, if the application does require mutual authentication (e.g. authentication of both the client and the server), then at one point in the establishment of the TLS connection, the client will need to authenticate itself by producing a digital signature generated with a private key.

At least some embodiments described herein are generally directed to providing methods of warning users of a mobile device when a weak hash function has been used to generate a particular hash digest. A hash digest generated using a weak hash function is also referred to herein generally as a "weak digest". Since a hash function that is not considered weak at a particular point in time may be considered weak at some future point in time, a mechanism that accommodates changes in what hash functions are considered weak at a particular point in time and by which identification of hash functions that are considered weak at a given point in time can be made at a mobile device may be desirable.

In at least one example embodiment, an administrator may specify what hash functions are to be considered weak by the mobile device. The administrator may modify, from time to time, a listing of which hash functions are to be considered weak. The administrator may identify certain hash functions as weak using a user interface provided by a server (e.g. message management server 272 of FIG. 4), for example. The ability to specify weak hash functions may have applications to, without limitation, secure e-mail messaging functions or secure web browsing functions, or both, for example. If a weak hash function has been used to generate a hash digest being processed in accordance with one of these protocols, then the user is alerted. For example, in secure e-mail applications, a message comprising a digital signature formed using a weak digest may be processed such that a warning is provided, indicating that a weak digest was used, which is output to the user through a user interface at the mobile device. As a further example, when authenticating the sender of a signed message, if the sender's certificate belongs to a certificate chain that comprises a certificate having a digital signature formed using a weak digest, a warning may be output to the user through a user interface at the mobile device indicating that a weak digest was used. As a further example, in secure web browsing applications (e.g. using SSL), if the server's certificate belongs to a certificate chain that comprises a certificate having a digital signature formed using a weak digest, a warning may be output to the user through a user interface at the mobile device indicating that a weak digest was used.

In at least one variant embodiment, a mobile device user may specify what hash functions are to be considered weak by the mobile device. The mobile device user may modify, from time to time, a listing of which hash functions are to be considered weak. The mobile device user may identify certain hash functions as weak using a user interface provided by at the mobile device, for example.

In at least one variant embodiment, a mobile device user may specify what hash functions are to be considered sufficiently strong by the mobile device. The mobile device user may modify, from time to time, a listing of which hash functions are to be considered sufficiently strong. The mobile device user may identify certain hash functions as sufficiently strong using a user interface provided by at the mobile device, for example. This may allow hash functions that are not specified as sufficiently strong to be deemed as weak.

These and other features and embodiments will now be described with reference to FIGS. 8 to 11C.

Figure 8:
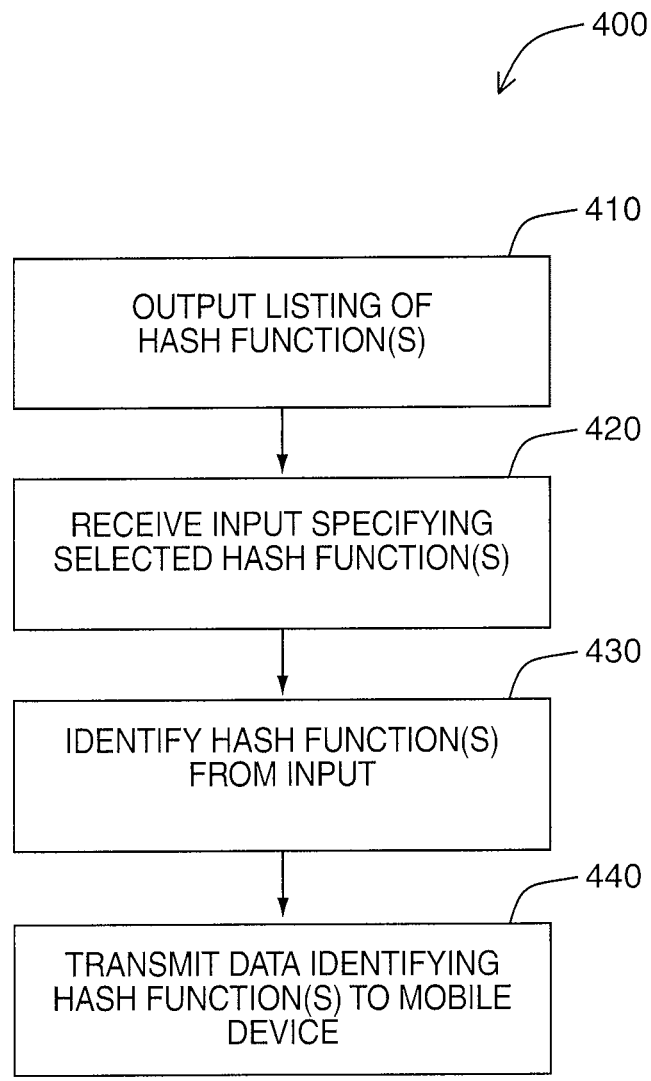
FIG. 8 is a flowchart illustrating a method of transmitting data that identifies at least one hash function to a mobile device in accordance with at least one embodiment.

Referring now to FIG. 8, a flowchart illustrating a method of transmitting data that identifies at least one hash function to a mobile device in accordance with at least one embodiment is shown generally as 400. Additional details of some of the features described below in respect of method 400 have been described earlier in the present description.

Method 400 is performed by an application that executes and resides on a server coupled to the mobile device (e.g. mobile device 100 of FIG. 1). In one example embodiment, the server is a message management server (e.g. message management server 272 of FIG. 4). The application implementing an embodiment described herein need not be a stand-alone application, and the functionality of the application as described herein may alternatively be distributed over multiple applications executing and residing on the server and optionally on other computing devices coupled thereto.

At 410, a listing of a plurality of hash functions is output, to a system administrator for example, in a user interface provided by the server. The hash functions in the listing include cryptographic hash functions (also referred to generally as cryptographic algorithms) that might be employed in generating hash digests for various applications at the mobile device.

Examples of cryptographic algorithms that may be employed include, without limitation: MD2, MD4, MD5, SHA-1, SHA-224, SHA-256, SHA-384, SHA-512, RIPEMD-128, and RIPEMD-160. Some or all of these may be identified in the output listing, and other algorithms (e.g. as they become known or as they are made available for use at the mobile device) may also be identified in the output listing.

In one example embodiment, the listing is output as a menu comprising a plurality of check box controls. Other types of controls that facilitate user identification or selection of items in the listing may be employed in variant embodiments. Each check box control corresponds to at least one of the hash functions in the listing. A user (e.g. a system administrator), via the user interface provided by the server, may select a hash function in the listing by activating the corresponding check box control through the user interface (e.g. by clicking on an empty check box, causing a check mark to be displayed in the check box). An example of a menu provided as output in a user interface provided by the server in accordance with this embodiment is shown generally as 411 in FIG. 9. In this example, the menu is displayed in the form of a pop-up menu 412. Pop-up menu 412 includes a title bar 413 that contains a header indicating to the user (e.g. a system administrator) that he or she is to select the hash functions from the list of hash functions 414, if any, that he or she considers as weak. Corresponding check boxes 415 are provided to facilitate user selection. When a particular hash function is selected so as to identify it as weak, a check mark 416 is displayed in the corresponding check box 415. Buttons 417 and 418 are provided that allow the user to respectively accept or cancel the selections made.

Referring again to FIG. 8, at 420, where the user (e.g. a system administrator), via the user interface provided by the server, has identified at least one hash function as being weak, user input specifying one or more selected hash functions is received by the server.

At 430, at least one hash function is identified at the server from the user input received at 420. In one embodiment, the identified hash functions correspond to the one or more hash functions selected by the user based on the input received at 420. However, in variant embodiments, the server may be configured to automatically override certain user selections by modifying the set of user-selected hash functions when identifying hash functions at 430. For example, additional hash functions that may or may not have been displayed to the user (e.g. the system administrator) or selected by him or her can be identified at 430. Certain selected hash functions may be deemed as not having been selected and not identified at 430. Whether or not modifications are made to the set by the server that overrides the user's selections might depend on the particular application for which the server expects the client to utilize the data transmitted at 440 (described below), or the particular mobile device to which data is sent at 440 (described below), for example.

At 440, data identifying the at least one hash function identified at 430 is transmitted to the mobile device.

The data may then be used by the mobile device to determine whether a hash function that is used to generate a given hash digest is weak. In one embodiment, the data is transmitted to the mobile device as security policy data (e.g. IT Policy data).

Figure 9:
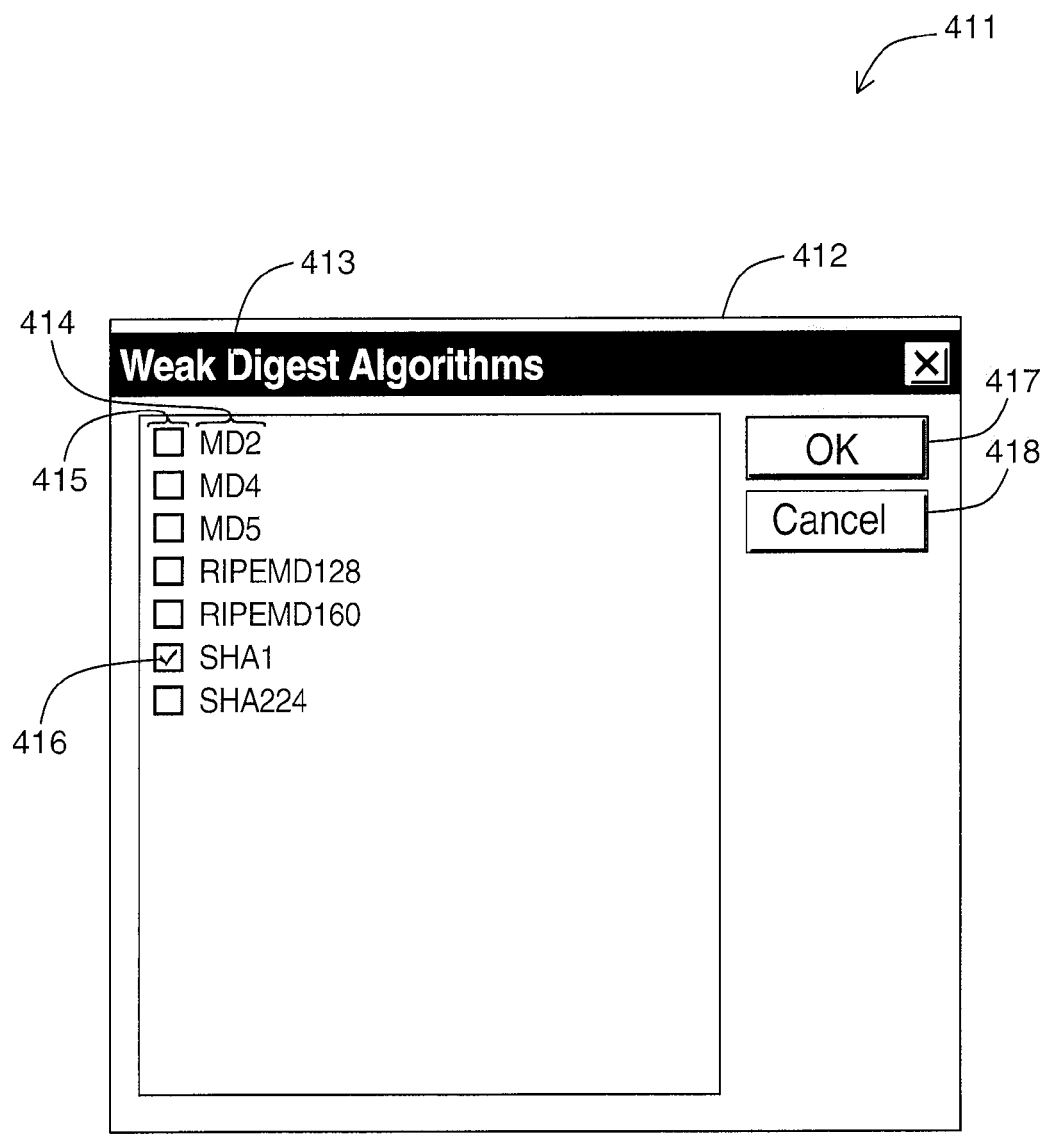
FIG. 9 is an example screenshot illustrating a user interface provided by a server in accordance with one example embodiment.

In the foregoing example embodiments, including the embodiment for which an example user interface provided by the server is illustrated with reference to FIG. 9, the user (e.g. a system administrator) may select a number of hash functions that he or she considers to be weak, and data identifying the selected weak hash functions is transmitted to the mobile device. Accordingly, the data received from the server at the mobile device identifies at least one weak hash function. However, in variant embodiments, the data received from the server at the mobile device may instead identify at least one sufficiently strong hash function, such that any hash function not identified from the received data is deemed to be weak. For example, in one such variant embodiment, a user interface may be provided that allows a user (e.g. a system administrator) to identify hash functions that are not considered weak (i.e. sufficiently strong hash functions); any hash functions not so identified (e.g. unchecked boxes) would then be considered weak.

Figure 10:
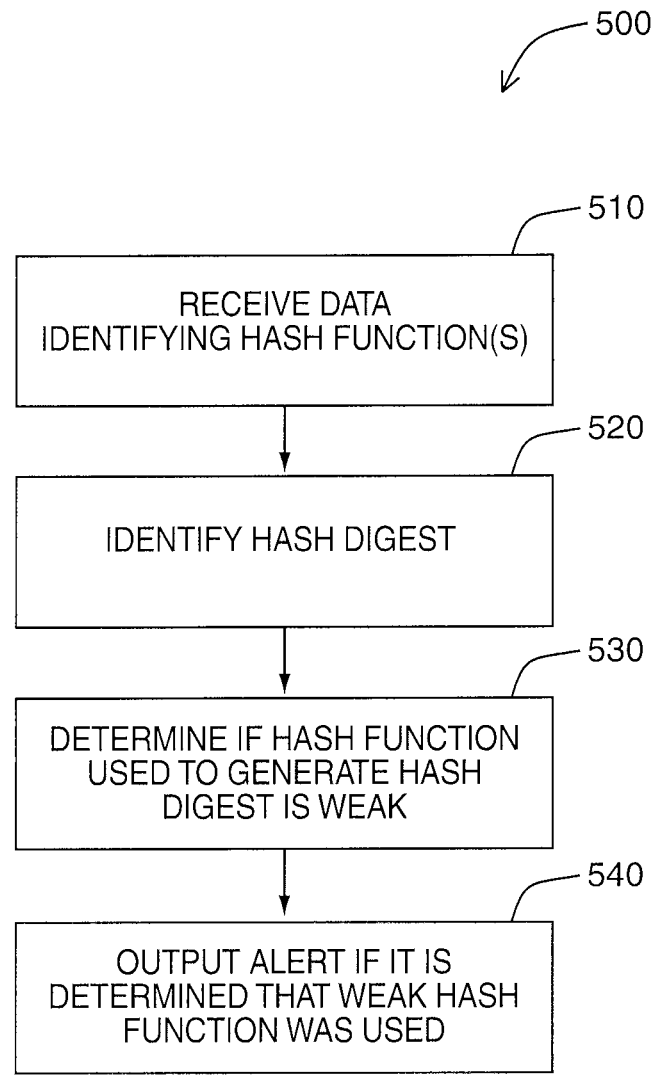
FIG. 10 is a flowchart illustrating a method of outputting an alert on a mobile device to indicate the use of a weak hash function in accordance with at least one embodiment.

Referring now to FIG. 10, a flowchart illustrating a method of outputting an alert on a mobile device to indicate the use of a weak hash function in accordance with at least one embodiment is shown generally as 500. Additional details of some of the features described below in respect of method 500 have been described earlier in the present description.

Method 500 is performed by an application that executes and resides on a mobile device (e.g. mobile device 100 of FIG. 1). The application implementing an embodiment described herein need not be a stand-alone application, and the functionality of the application as described herein may alternatively be distributed over multiple applications executing and residing on the mobile device.

At 510, data is received from a server from which at least one hash function can be identified. For example, the data received at 510 may be the data transmitted to a mobile device from a server as described with reference to FIG. 8. The server may be, for example, a message management server. In one embodiment, the data is received at the mobile device as security policy data (e.g. IT Policy data).

In at least one example embodiment described herein, the data received from the server identifies at least one weak hash function. However, in variant embodiments, the data received from the server identifies at least one sufficiently strong hash function, and a hash function that is used to generate a particular hash digest is determined to be weak (e.g. at 530) if the hash function is not identified in the data received from the server at 510.

It will be understood by persons skilled in the art that the data received may indicate that no hash functions are to be considered as weak. In that case, all hash functions that might be considered at the mobile device may be identified as sufficiently strong.

In at least one variant embodiment, a mobile device user may specify what hash functions are to be considered weak by the mobile device. The mobile device user may modify, from time to time, a listing of which hash functions are to be considered weak. The mobile device user may identify certain hash functions as weak using a user interface provided by at the mobile device, for example. The data received at 510 from which at least one hash function can be identified would originate from the mobile device rather than from the server in these variant embodiments.

In at least one variant embodiment, a mobile device user may specify what hash functions are to be considered sufficiently strong by the mobile device. The mobile device user may modify, from time to time, a listing of which hash functions are to be considered sufficiently strong. The mobile device user may identify certain hash functions as sufficiently strong using a user interface provided by at the mobile device, for example. This may allow hash functions that are not specified as sufficiently strong to be deemed as weak.

At 520, a hash digest is identified at the mobile device. Some example applications will be described with reference to FIGS. 11A to 11C.

At 530, using the data received at 510, it is determined whether a hash function used to generate the hash digest identified at 520 is weak. For example, if the data received from the server at 510 identifies weak hash functions then the hash function used to generate the hash digest is determined to be weak if that hash function is so identified in the data received from the server (i.e. the hash function used to generate the hash digest matches one that has been identified in the data received from the server). Alternatively, for example, if the data received from the server at 510 identifies sufficiently strong hash functions, then the hash function used to generate the hash digest is determined to be weak if the hash function is not so identified in the data received from the server (e.g. the hash function used to generate hash digest does not match any of the ones identified in the data received from the server).

In variant embodiments, if a combination of hash functions were used to generate a given hash digest, the determination made at 530 may be repeated for each hash function. Depending on the level of security desired, the hash digest might be identified as weak if any of the hash functions used to generate the hash digest is determined to be weak, in one example embodiment. In a variant embodiment, the hash digest may be identified as weak only if all of the hash functions that are used to generate the hash digest are determined to be weak. Different criteria for determining whether a hash digest is to be identified as weak wherein a combination of hash functions have been used to generate the hash digest, may be employed in variant embodiments.

At 540, an alert indicating that a weak hash function was used to generate the hash digest identified at 520 is output to a user of the mobile device through a user interface provided at the mobile device, if it is determined at 530 that the hash function used to generate the hash digest is weak. For example, a window or dialog box comprising a warning that a weak hash function has been used to generate the hash digest may be displayed to the user of the mobile device. The user of the mobile device may then be provided with different options for action, appropriate for the particular application, which may be taken after having been alerted of the use of the weak hash function.

Embodiments described herein may be suitable for a number of applications in which it may be desirable to alert a mobile device user when a hash digest has been generated using a weak hash function. Applications implementing certain example embodiments are described with reference to FIGS. 11A to 11C. These are provided as examples only, and other applications are possible in variant embodiments.

Figure 11A:
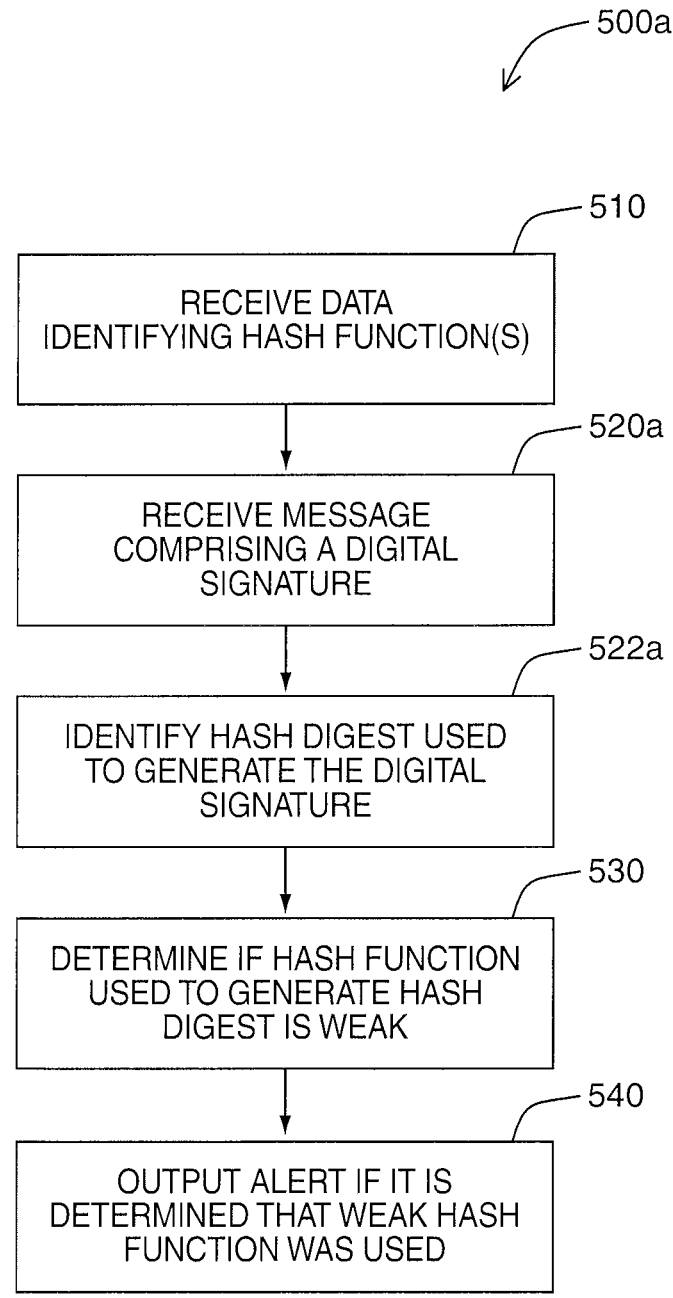
FIGS. 11A to 11C are flowcharts illustrating a method of outputting an alert on a mobile device to indicate the use of a weak hash function in accordance with a number of example embodiments.

Referring to the flowchart of FIG. 11A, the identified hash digest may be one that has been used to form a digital signature of a message (e.g. message 350 of FIG. 6) received at the mobile device in one example embodiment, shown generally as 500*a*. At 520*a*, a message comprising a digital signature is received at the mobile device. At 522*a*, the hash digest used to form the digital signature is identified. The hash function used to generate the hash digest of the digital signature in the received message may be identified in a message header (e.g. header 352 of FIG. 6), or elsewhere in the message, for example. The remaining steps have been described with reference to FIG. 10.

Figure 11B:
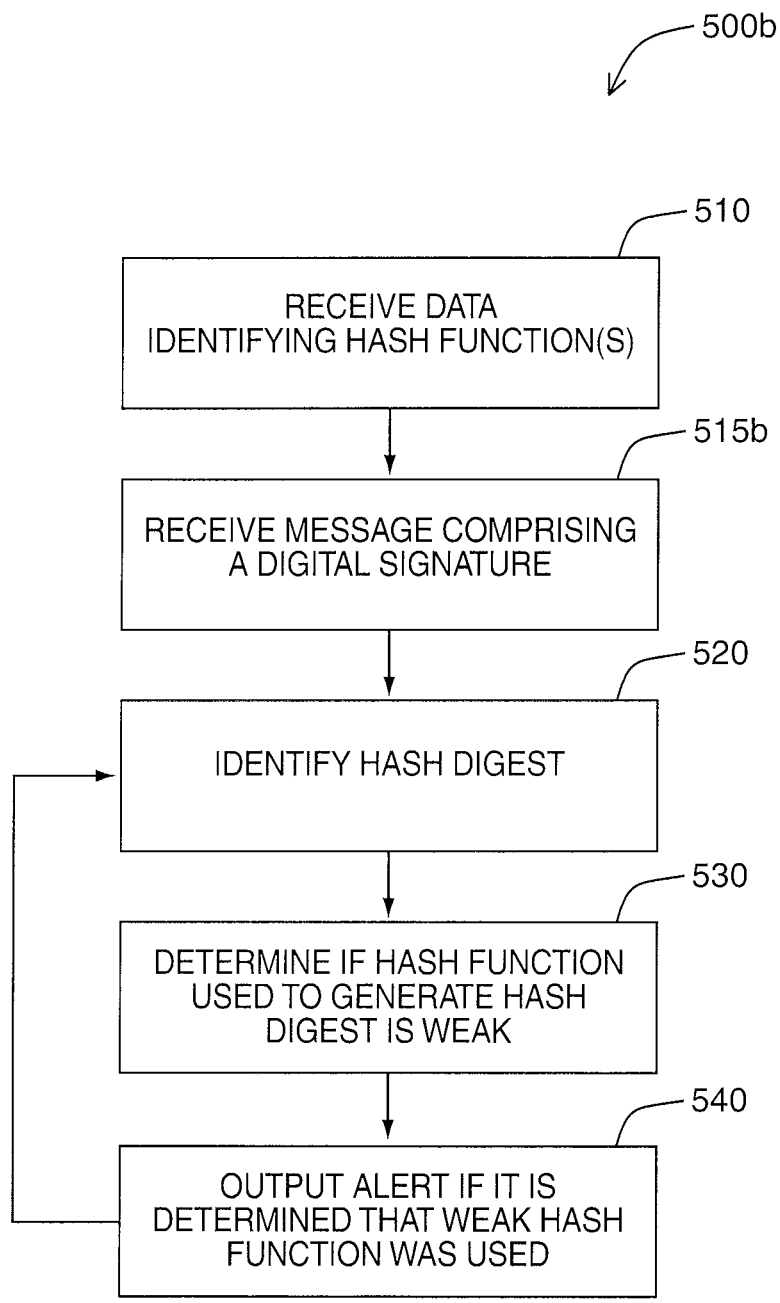

Referring to the flowchart of FIG. 11B, the identified hash digest may be one that has been used to form a digital signature of a certificate belonging to a certificate chain that comprises the certificate of a sender of a message received at the mobile device in one example embodiment, shown generally as 500*b*. At 515*b*, a message comprising a digital signature is received at the mobile device. The digital signature is verifiable using a public key of a sender. The public key will generally be associated with a digital certificate of the sender, which may accompany the message or which may be retrieved from a certificate server, for example. In order to authenticate the sender of the message, the digital signature may be verified using the public key, and the verification may comprise checking that the certificate chains to a trusted certificate. This may require multiple digital signatures in a certificate chain (e.g. certificate chain 300 of FIG. 5) to be verified [acts not explicitly shown in FIG. 11B]. Steps 520 to 540 are repeated to identify each hash digest that has been used to form a digital signature in the certificate chain (at 520), to determine if the respective hash digest was generated using a weak hash function (at 530), and to alert the user accordingly if it is so determined (at 540). The hash function that was used to generate a given hash digest used to form a digital signature of a particular certificate may be identified in the certificate. The remaining steps have been described with reference to FIG. 10.

Figure 11C:
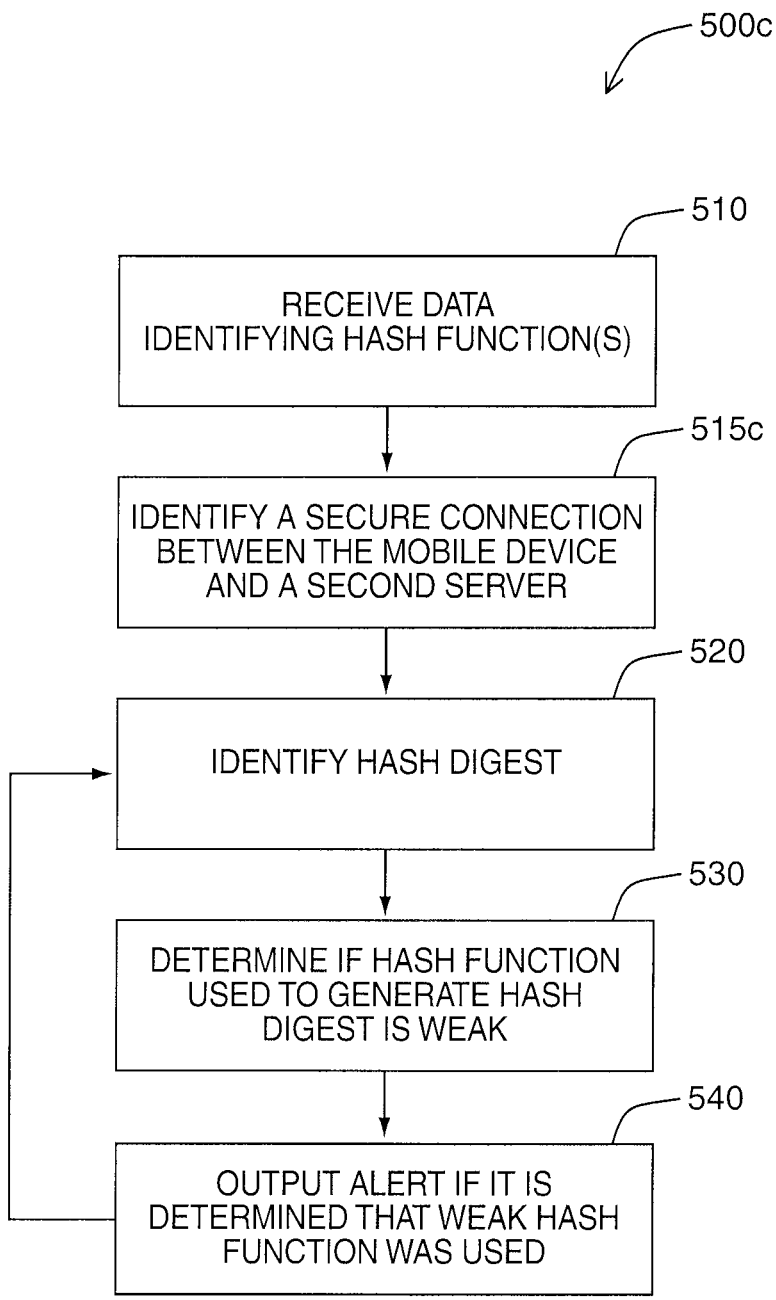

Referring to the flowchart of FIG. 11C, the identified hash digest may be one used to form a digital signature of a certificate belonging to a certificate chain that comprises the certificate of a server in respect of a secure connection established or to be established between a mobile device and a second server (e.g. a web server, or other server 380 of FIGS. 7A and 7B) in one example embodiment, shown generally as 500*c*. At 515*c*, a secure connection (e.g. an SSL or TLS connection) between the mobile device and the second server is identified. In order to authenticate the server, the digital signature of a certificate associated with the second server may be verified. The verification may comprise checking that the certificate chains to a trusted CA certificate. This may require multiple digital signatures in a certificate chain to be verified [acts not explicitly shown in FIG. 11C]. Verification may require one or more certificates to be retrieved from a certificate server. Steps 520 to 540 are repeated to identify each hash digest that has been used to form a digital signature in the certificate chain (at 520), to determine if the respective hash digest was generated using a weak hash function (at 530), and to alert the user accordingly if it is so determined (at 540). The hash function that was used to generate a given hash digest used to form a digital signature of a particular certificate may be identified in the certificate. The remaining steps have been described with reference to FIG. 10.

Persons skilled in the art will understand that a "hash digest" that is identified at the mobile device such that a determination of whether a weak hash function has been used to generate the hash digest is weak may be a Message Authentication Code (MAC), a keyed-Hash Message Authentication Code (HMAC), or other similar construct, for example. Where such constructs are used, an alert may be output to a user to indicate when the applicable coding or hash function used is considered weak, in accordance with one or more embodiments described herein.

It will also be understood by persons skilled in the art that the hash functions that are identified as weak in accordance with one or more embodiments described herein may also be identified on an application-specific basis. Different hash functions may be considered weak for certain applications, but not for others. A system administrator, for example, may identify which hash functions should be considered weak for specified applications, in variant embodiments.

In a variant embodiment, some of the acts performed in a method of outputting an alert on a mobile device to indicate the use of a weak hash function may be performed on a second device coupled to the mobile device. For example, a proxy server (e.g. intermediate proxy server 390 of FIG. 7B) may be employed to determine if a weak hash function has been used to generate a particular hash digest, and to provide an indication to the mobile device so that a user of the mobile device may be alerted accordingly. This may permit some of the processing load that would be otherwise borne by the mobile device in performing certain acts to be transferred to the proxy server or other device coupled to the mobile device.

The acts performed in respect of a method described herein in accordance with any of the embodiments described herein may be provided as executable software instructions stored on computer-readable media, which may include transmission-type media.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The present disclosure makes reference to a number of embodiments. However, it will be understood by persons skilled in the art that other variants and modifications may be made without departing from the scope of the invention as defined in the claims appended hereto.

The invention claimed is:

1. A method of outputting an alert on a mobile device, the method comprising:
receiving data that identifies both at least one first hash function and at least one application, wherein each of the at least one first hash function identified in the data is identified as being weak;
identifying a public key associated with a first certificate of a plurality of certificates belonging to a certificate chain;
repeating, for each of the plurality of certificates belonging to the certificate chain,
identifying a second hash function used to digitally sign the certificate; and
determining whether the second hash function used to digitally sign the certificate is weak, based on the data,
wherein the second hash function used to digitally sign the certificate is determined to be weak if:
the second hash function used to digitally sign the certificate matches any of the at least one first hash function identified in the data, and
the determining is being performed for an application identified in the data; and
outputting the alert when, for at least one certificate of the plurality of certificates belonging to the certificate chain, the second hash function used to digitally sign the at least one certificate is determined to be weak.

2. The method of claim 1, wherein the data that identifies both the at least one first hash function and the at least one application is received from a first server.

3. The method of claim 2, wherein the first server comprises a message management server.

4. The method of claim 2, wherein the data is received from the first server in the form of security policy data.

5. The method of claim 1, wherein the data that identifies both the at least one first hash function and the at least one application is received through a user interface on the mobile device.

6. The method of claim 1, wherein the method is performed, at least in part, by the mobile device.

7. The method of claim 1, wherein the method is performed, at least in part, by a second device coupled to the mobile device.

8. The method of claim 7, wherein the second device coupled to the mobile device comprises a proxy server.

9. A mobile device comprising a processor and a memory, wherein the mobile device is programmed to execute a plurality of instructions which, when executed, cause the processor to:
receive data that identifies both at least one first hash function and at least one application, wherein each of the at least one first hash function identified in the data is identified as being weak;
identify a public key associated with a first certificate of a plurality of certificates belonging to a certificate chain;
repeat, for each of the plurality of certificates belonging to the certificate chain,
identifying a second hash function used to digitally sign the certificate; and
determining whether the second hash function used to digitally sign the certificate is weak, based on the data,
wherein the second hash function used to digitally sign the certificate is determined to be weak if:
the second hash function used to digitally sign the certificate matches any of the at least one first hash function identified in the data, and
the determining is being performed for an application identified in the data; and
output an alert when, for at least one certificate of the plurality of certificates belonging to the certificate chain, the second hash function used to digitally sign the at least one certificate is determined to be weak.

10. The mobile device of claim 9, wherein the data that identifies both the at least one first hash function and the at least one application is received from a first server.

11. The mobile device of claim 10, wherein the first server comprises a message management server.

12. The mobile device of claim 10, wherein the data is received from the first server in the form of security policy data.

13. The mobile device of claim 9, wherein the data that identifies both the at least one first hash function and the at least one application is received through a user interface on the mobile device.

14. A non-transitory computer-readable medium on which a plurality of executable instructions is stored, the instructions for causing a mobile device to:
receive data that identifies both at least one first hash function and at least one application, wherein each of the at least one first hash function identified in the data is identified as being weak;
identify a public key associated with a first certificate of a plurality of certificates belonging to a certificate chain;
repeat, for each of the plurality of certificates belonging to the certificate chain,
identifying a second hash function used to digitally sign the certificate; and
determining whether the second hash function used to digitally sign the certificate is weak, based on the data,
wherein the second hash function used to digitally sign the certificate is determined to be weak if:
the second hash function used to digitally sign the certificate matches any of the at least one first hash function identified in the data, and
the determining is being performed for an application identified in the data; and
output an alert when, for at least one certificate of the plurality of certificates belonging to the certificate chain, the second hash function used to digitally sign the at least one certificate is determined to be weak.

15. A method of transmitting data to a mobile device from a server, the method comprising the server:
identifying both at least one first hash function and at least one application, wherein each of the at least one first hash function is identified as being weak; and
transmitting data identifying the at least one first hash function and the at least one application to the mobile device, the mobile device:
identifying a public key associated with a first certificate of a plurality of certificates belonging to a certificate chain; and
repeating, for each of the plurality of certificates belonging to the certificate chain,
identifying a second hash function used to digitally sign the certificate; and
determining whether the second hash function used to digitally sign the certificate is weak, based on the data,
wherein the second hash function used to digitally sign the certificate is determined to be weak if:
the second hash function used to digitally sign the certificate matches any of the at least one first hash function identified in the data, and
the determining is being performed for an application identified in the data; and outputting an alert when, for at least one certificate of the plurality of certificates belonging to the certificate chain, the second hash function used to digitally sign the at least one certificate is determined to be weak.

16. The method of claim 15, wherein each of the at least one first hash function is identified as being weak.

17. The method of claim 15, further comprising outputting a listing of a plurality of first hash functions in a user interface, and receiving input specifying one or more selected first hash functions from the plurality of first hash functions, wherein the at least one first hash function identified at the server comprises the one or more selected first hash functions.

18. The method of claim 17, wherein the listing is output as a menu comprising a plurality of check box controls, wherein each check box control corresponds to a corresponding one of the plurality of first hash functions in the listing, and wherein any one of the plurality of first hash functions in the listing is selectable by activating the corresponding check box control.

19. The method of claim 15, wherein the data transmitted to the mobile device is in the form of security policy data.

20. The method of claim 15, wherein the server comprises a message management server.

* * * * *